US012632298B2

(12) United States Patent
Saby et al.

(10) Patent No.: US 12,632,298 B2
(45) Date of Patent: May 19, 2026

(54) METHOD TO DYNAMICALLY REGULATE VOLATILE AND NON-VOLATILE MEMORY POOLS ON PERSISTENT MEMORY ACROSS CLOUD

(71) Applicant: DELL PRODUCTS L.P., Round Rock, TX (US)

(72) Inventors: Vinod Parackal Saby, Bangalore (IN); Parth Girishkumar Bera, Bangalore (IN); Navdeeppal Singh, Bangalore (IN); Krishnaprasad Koladi, Bengaluru (IN)

(73) Assignee: DELL PRODUCTS L.P., Round Rock, TX (US)

( * ) Notice: Subject to any disclaimer, the term of this patent is extended or adjusted under 35 U.S.C. 154(b) by 698 days.

(21) Appl. No.: 17/967,138

(22) Filed: Oct. 17, 2022

(65) Prior Publication Data

US 2024/0126601 A1     Apr. 18, 2024

(51) Int. Cl.
*G06F 9/46* (2006.01)
*G06F 9/50* (2006.01)

(52) U.S. Cl.
CPC .......... *G06F 9/5016* (2013.01); *G06F 9/5044* (2013.01); *G06F 2209/5011* (2013.01)

(58) Field of Classification Search
CPC .... G06F 9/5016; G06F 9/5044; G06F 9/5037; G06F 2209/5011
See application file for complete search history.

(56) References Cited

U.S. PATENT DOCUMENTS

| | | | |
|---|---|---|---|
| 10,261,712 B2 | 4/2019 | Agombar et al. | |
| 10,432,464 B2 | 10/2019 | Franke et al. | |
| 11,270,201 B2 | 3/2022 | Sridharan et al. | |
| 11,436,202 B2 | 9/2022 | Dornemann | |
| 11,456,966 B2 | 9/2022 | Guim Bernat et al. | |
| 2005/0114621 A1* | 5/2005 | Lahiri ................... | G06F 12/023 711/170 |
| 2016/0179375 A1* | 6/2016 | Kirvan ................ | G06F 12/0246 711/153 |
| 2019/0050261 A1* | 2/2019 | Schmisseur ......... | H04L 43/0817 |
| 2020/0136943 A1 | 4/2020 | Banyai et al. | |
| 2021/0117242 A1 | 4/2021 | Van De Groenendaal et al. | |
| 2021/0144517 A1 | 5/2021 | Guim Bernat et al. | |
| 2022/0050722 A1* | 2/2022 | Dugast .................. | G06F 9/5016 |
| 2022/0058041 A1 | 2/2022 | Nair | |
| 2022/0197773 A1 | 6/2022 | Butler et al. | |
| 2022/0222010 A1* | 7/2022 | Bachmutsky ......... | G06F 3/0655 |
| 2023/0401096 A1* | 12/2023 | Dubeyko .............. | G06F 9/5083 |

* cited by examiner

*Primary Examiner* — Diem K Cao
(74) *Attorney, Agent, or Firm* — Jackson Walker LLP; Christopher J. Rourk

(57) ABSTRACT

A system for managing non-transient memory in a cloud computing environment, comprising a plurality of data processors configured to cooperatively provide a cloud computing environment, a persistent memory pool system configured to interact with each of the plurality of data processors to identify persistent non-transient data memory devices at each of the data processors and a plurality of memory pools created by the persistent memory pool system, wherein each of the plurality of memory pools has a designated function.

20 Claims, 3 Drawing Sheets

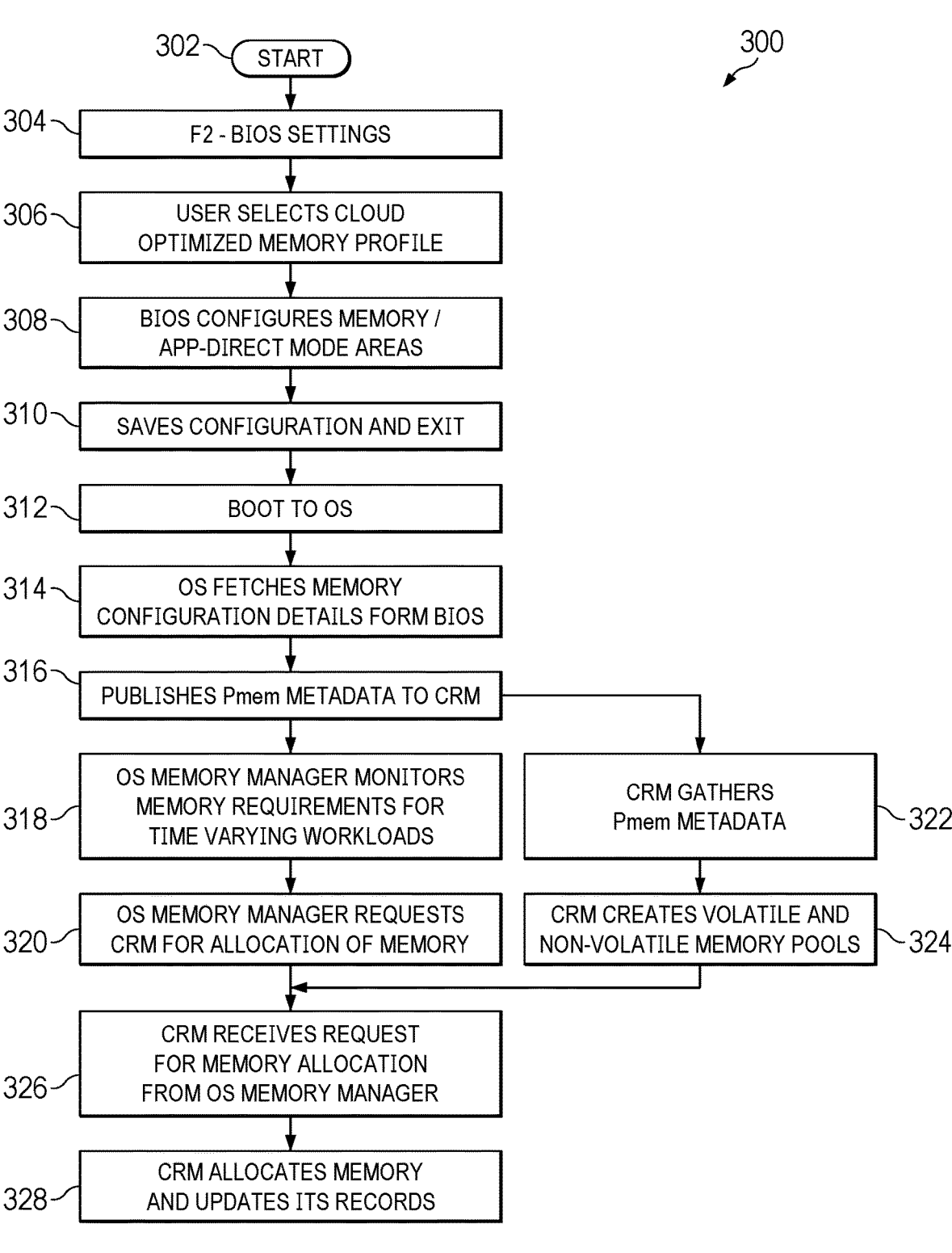

302 — START

304 — F2 - BIOS SETTINGS

306 — USER SELECTS CLOUD OPTIMIZED MEMORY PROFILE

308 — BIOS CONFIGURES MEMORY / APP-DIRECT MODE AREAS

310 — SAVES CONFIGURATION AND EXIT

312 — BOOT TO OS

314 — OS FETCHES MEMORY CONFIGURATION DETAILS FORM BIOS

316 — PUBLISHES Pmem METADATA TO CRM

318 — OS MEMORY MANAGER MONITORS MEMORY REQUIREMENTS FOR TIME VARYING WORKLOADS

322 — CRM GATHERS Pmem METADATA

320 — OS MEMORY MANAGER REQUESTS CRM FOR ALLOCATION OF MEMORY

324 — CRM CREATES VOLATILE AND NON-VOLATILE MEMORY POOLS

326 — CRM RECEIVES REQUEST FOR MEMORY ALLOCATION FROM OS MEMORY MANAGER

328 — CRM ALLOCATES MEMORY AND UPDATES ITS RECORDS

METHOD TO DYNAMICALLY REGULATE VOLATILE AND NON-VOLATILE MEMORY POOLS ON PERSISTENT MEMORY ACROSS CLOUD

TECHNICAL FIELD

The present disclosure relates generally to memory management, and more specifically to a method to dynamically regulate volatile and non-volatile memory pools on persistent memory across a cloud computing platform.

BACKGROUND OF THE INVENTION

Cloud computing platforms have limited ability to share hardware resources.

SUMMARY OF THE INVENTION

A system for managing non-transient memory in a cloud computing environment is provided. The system includes a plurality of data processors configured to cooperatively provide a cloud computing environment, a persistent memory pool system configured to interact with each of the plurality of data processors to identify persistent non-transient data memory devices at each of the data processors and a plurality of memory pools created by the persistent memory pool system, wherein each of the plurality of memory pools has a designated function.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which:

FIG. 3 is a diagram of an algorithm for dynamically regulating memory pools for a cloud computing platform, in accordance with an example embodiment of the present disclosure.

DETAILED DESCRIPTION OF THE INVENTION

Figure 1:
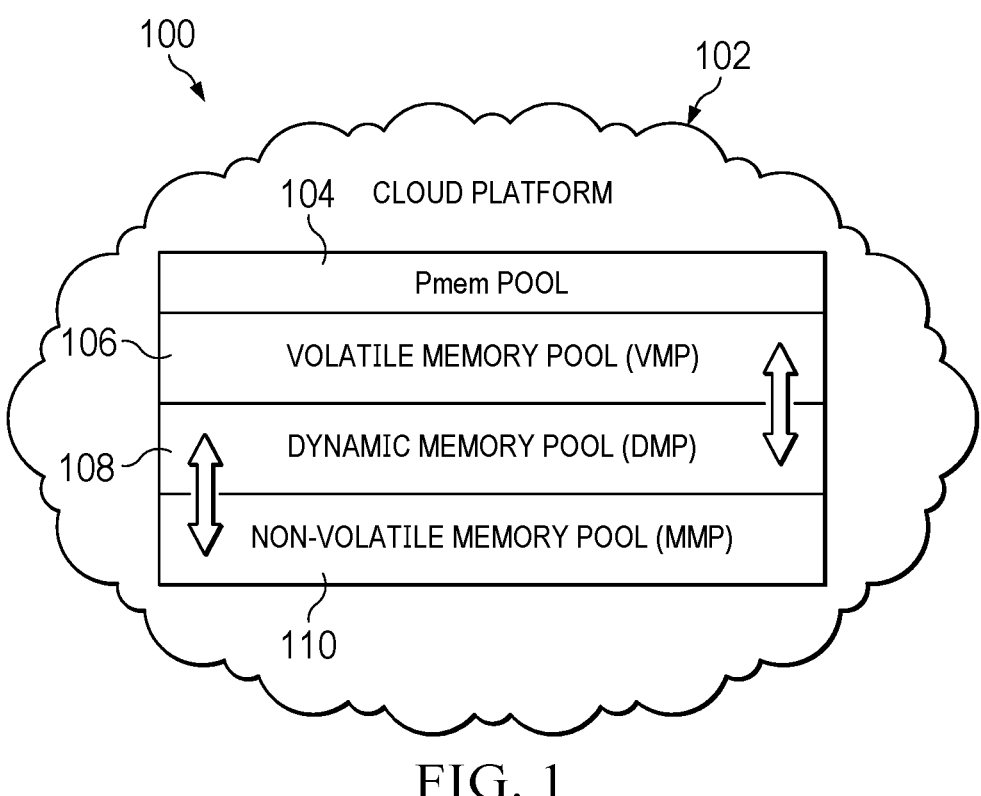
FIG. 1 is a diagram of a system for dynamically regulating memory pools for a cloud computing platform, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

Cloud computing platforms use different memory technologies to meet their workload demands. However, there is no available mechanism for cloud computing platforms that can provide both volatile and non-volatile memory extensibility on a single memory class such as persistent memory (Pmem) without downtime.

Intel® Optane™ memory provides an option called mixed mode which allows memory to be utilized as volatile and non-volatile, based on the workload requirements. The present disclosure provides a mechanism that is configured to group memory modules such as Pmem or other suitable modules that are available on cloud computing platforms to form different memory pools. A first example memory pool includes a volatile memory pool (VMP), a second example memory pool includes a dynamic memory pool (DMP), and a third example memory pool includes a non-volatile memory pool (NMP), in addition to other suitable memory pools. Each of these example memory pools can be configured at instantiation by respective system BIOS and configuration details can be passed on to the respective OS or hypervisor. Based on the run time memory requirements (such as volatile, non-volatile or other requirements) of the workloads running on the cloud computing platform, a cloud resource manager (CRM) can be configured to adjust a memory pool size from the DMP to VMP and/or NMP as needed. To configure above mentioned memory pools, this SW-defined memory (SDM) concept can be applied at the CRM level.

The OS or hypervisor can use the memory configuration details obtained from BIOS to dynamically extend the memory areas based on the run time requirements. The present disclosure leverages open sound control (OSC) or other suitable methods to allow the OS to handle dynamic changes in a memory area, so that the scheduler and applications are made aware of the same. The present disclosure thus provides a mechanism for processors in the pool to dynamically change the VMP and NMP as their respective workloads scale up or down. This change can be achieved using an OS or hypervisor memory manager assisted Pmem allocation at runtime.

By providing an option to group all Pmem modules on the cloud as volatile or non-volatile software-defined memory pools that can adjust optimally to adapt time varying workloads, a number of advantages can be obtained. One advantage is that the use of Pmem modules on the cloud computing platform can be optimized to serve different types of memory requirements of workloads, which can reduce the complexity of types of memory modules to deal with in a cloud platform. Another advantage is a reduced cost of operation from using Pmem as both volatile and non-volatile memory to support workloads with different memory requirements. The present disclosure can result in a reduction in downtime and dynamic adjustment of Pmem leveraged memory pools, which can enable users to adjust a memory allocation based on changing applications needs.

The present disclosure can be used with a Pmem mixed mode that can involve dynamically allocating Pmem between volatile (system memory) and non-volatile (persistent block storage) regions. A cloud processing optimized memory profile such as 40:20:40 or other suitable profile can be used in the system BIOS, to allow all Pmems to be initialized and booted to the OS. The example workflows disclosed herein below provide implementation details, dynamic allocation aspects and other novel features.

In one example embodiment, a user interface can be generated to allow a user to choose a cloud optimized memory profile, and BIOS can create a suitable number of memory regions, such as a fixed region for system memory (volatile memory), a fixed region for persistent storage (non-volatile memory) and a free pool (dynamic memory area) or other suitable memory regions. By way of example and not by limitation, for a 6 TB Pmem configured system, a BIOS could pre-configure 2 TB as system memory, 2 TB as persistent storage and the remaining 2 TB in the dynamic memory area (DMA) region. Based on the time varying workload requirements, the OS memory scheduler/block storage subsystem can be configured to readjust the system memory/persistent storage block device as appropriate with the help of CRM.

In another example embodiment, CRM can be configured as a service running on the cloud management machine that orchestrates memory resource requirements on the cloud with time varying workloads. CRM can group Pmem available on the cloud and can create memory pools out of them using SDM, such as VMP, DMP and NMP. Real-time adjustments to these pools can be orchestrated again by CRM, in co-ordination with OS memory manager and BIOS of respective systems, or in other suitable manners.

The present disclosure provides for memory pools across cloud computing platforms on Pmem, such as VMP, DMP, NMP and other suitable memory pools. The memory pools can be abstracted as SDM, which can be orchestrated by CRM from creation to retirement. CRM can communicate to each server on the cloud to collect a respective Pmem mapping, such as to create a meta-database or for other suitable purposes.

Parameters considered when allocating memory to workloads can be orchestrated by CRM, such as the creation, maintenance, and retirement of memory pools across the cloud. CRM can collect runtime memory requirements from participating systems and make memory allotments as a function of the existing memory location, the distribution of workload, the memory type requested, the total free memory left on the system where memory is physically present and other considerations.

CRM can orchestrate dynamic memory pool adjustments based on time varying workloads. The OS memory manager on each individual machine can set up a suitable threshold, such as 80% or other suitable thresholds, and provide a usage warning for both system memory and Pmem block storage. When system memory crosses the threshold utilization, the memory manager can notify CRM to allocate a certain amount of DMP to the system memory area pool. Similarly, when Pmem block storage crosses the threshold, the memory manager can notify CRM to allocate a predetermined amount of DMP as block IO storage. In this manner, the memory pool range can be extended using SDM as allocated memory that is physically located on another machine. The BIOS of the system where the memory is physically located can extend the volatile/non-volatile memory based on the request and update the NVDIMM structures using the firmware interface table (FIT), which is similar to an NVDIMM hot plug scenario. In this example embodiment, the Pmem driver within the OS can be used to make a call to BIOS to extend the system memory, the application direct space or other suitable memory structures. The BIOS can dynamically extend the block storage space and initiate a goal update as part of backend processing.

Intelligent CRM can manage performance aspects of memory allocation as a function of the existing memory location, distribution of workloads, memory type requested, total free memory left on the system where memory is physically present and other suitable factors. An individual compute node can have local data in the Pmem address ranges, such that for a process making use of a Pmem region, the node memory scheduler can first make a request for allocating that local address range for the process before it looks for remote Pmem address ranges.

In another example embodiment, an advanced configuration and power interface (ACPI) non-volatile dual in-line memory module (NVDIMM) FIT (NFIT) table can be used to provide a range structure that an individual compute node in the cloud computing platform can publish Pmem address ranges to, to facilitate the ability of CRM to make a better decision when it comes to process/VM scheduling.

OS can use memory configuration details obtained from BIOS to dynamically extend the memory areas based on the run time requirements. The present disclosure leverages OSC from the OS to process a dynamic change in memory area, so that the scheduler and applications are able to utilize the memory areas.

The present disclosure provides preset profiles that can be configured to set the ratio of different types of memory, such as memory mode, application direct mode, DMA or other suitable types of memory, when a system is added to the cloud computing system for the first time. By choosing this profile from BIOS settings while onboarding a system to cloud, a user can set the system memory profile to a standard predefined state.

The size of DMA is arrived at as a function of the requirements of the memory mode and application direct mode memory area. When onboarding a system to the cloud, a user can select a cloud optimized memory profile in a BIOS user interface setting, to allocate a minimum amount of memory for an application direct mode (NMP) and a memory mode (VMP). The rest of the space can be configured as a dynamic memory area (DMP) or in other suitable manners.

BIOS can be configured to manage NVDIMM address ranges using a System Physical Address (SPA) range structure as part of the NFIT table. When a user selects the cloud optimized memory profile using a user interface that is configured to allow a user to implement that configuration, an algorithm associated with the user selection can configure BIOS to set up an address range type GUID (a custom vendor UID) for the dynamic memory area (DMA), such as one that is shown in the ACPI spec 6.3 Table 5-132 SPA Range structure or other suitable address range types.

Once the OS boots, it can be configured to read NFIT and use the address range designated for VMP and the range designated for block IO. In addition, the OS memory manager can be configured to read the DMP address range using the GUID. At this point, the OS Memory manager has obtained the different physical address ranges used for system memory, block IO and the dynamic memory area that is kept free but hidden from applications. The OS memory manager can be configured to use a threshold mechanism for checking the usage of VMP as well as NMP.

By way of example and not by limitation, for a total Pmem memory of 1 TB, 256 GB can be allocated for VMP for system memory, and 256 GB can be allocated for NMP for application direct mode, leaving 500 GB for dynamic memory area (DMP). The OS memory manager can be configured to set up a threshold of 80% usage for a warning for both system memory and Pmem block storage. When system memory crosses the 80% utilization threshold, the memory manager can be configured to generate a notification to the CRM to allocate a predetermined amount of DMP to the system memory area pool. Similarly, when the Pmem block storage crosses the 80% utilization threshold, the memory manager informs CRM to allocate a predetermined amount of DMP as block IO storage. In this manner, the memory pool range can be extended using SDM as the allocated memory, which could be physically located on another machine.

The BIOS of the system where the memory is physically located can extend the volatile/non-volatile memory based on the request and updates the NVDIMM structures using FIT, similar to an NVDIMM hot plug scenario. The driver in the OS can be configured to make a call to BIOS to extend the application direct space in such a way that the existing goal is changed dynamically so that BIOS can extend the block storage space and kick off a goal update in the backend. A new goal can be created, depending upon the implementation, and then the NVDIMM structure can be updated using FIT.

The systems and algorithms of the present disclosure enable volatile and non-volatile memory pools to be supported at run-time on Pmem mixed mode for different types of workloads on a cloud computing platform. The size of the volatile and non-volatile memory pools on Pmem in mixed mode can be based on run time workload demands of the cloud computing platform. The present disclosure allows Pmem to be used for different types of workloads such as volatile and non-volatile. The volatile and non-volatile memory pools can be dynamically adjusted at runtime without causing any downtime.

FIG. 1 is a diagram of a system 100 for dynamically regulating memory pools for a cloud computing platform, in accordance with an example embodiment of the present disclosure. System 100 includes cloud platform 102, Pmem pool 104, volatile memory pool 106, dynamic memory pool 108 and non-volatile memory pool 110.

Cloud platform 102 can be implemented as a plurality of processors and associated systems and components that provide a cloud data processing environment. In one example embodiment, the processors can include system memory that has been loaded with one or more algorithms that cause the processors to cooperatively provide cloud computing services to a plurality of users, such as by instantiating VMs, using containers or in other suitable manners.

Pmem pool 104 can be implemented in hardware or a suitable combination of hardware and software, and can include one or more algorithms that cause an associated processor to allocate persistent memory to one or more memory pools. In one example embodiment, the number of memory pools and their allocation across the processors of cloud platform 102 can be dynamically modified as a function of system conditions, applications and other suitable parameters as discussed and described in greater detail herein.

Volatile memory pool 106 can be implemented in hardware or a suitable combination of hardware and software, and can include one or more algorithms that cause an associated processor to allocate persistent memory to a volatile memory pool. In one example embodiment, the allocation of persistent memory of a processor of cloud platform 102 to volatile memory pool 106 can be dynamically modified as a function of system conditions, applications and other suitable parameters as discussed and described in greater detail herein.

Dynamic memory pool 108 can be implemented in hardware or a suitable combination of hardware and software, and can include one or more algorithms that cause an associated processor to allocate persistent memory to a dynamic memory pool. In one example embodiment, the allocation of persistent memory of a processor of cloud platform 102 to dynamic memory pool 108 can be dynamically modified as a function of system conditions, applications and other suitable parameters as discussed and described in greater detail herein.

Non-volatile memory pool 110 can be implemented in hardware or a suitable combination of hardware and software, and can include one or more algorithms that cause an associated processor to allocate persistent memory to a non-volatile memory pool. In one example embodiment, the allocation of persistent memory of a processor of cloud platform 102 to non-volatile memory pool 110 can be dynamically modified as a function of system conditions, applications and other suitable parameters as discussed and described in greater detail herein.

Figure 2:
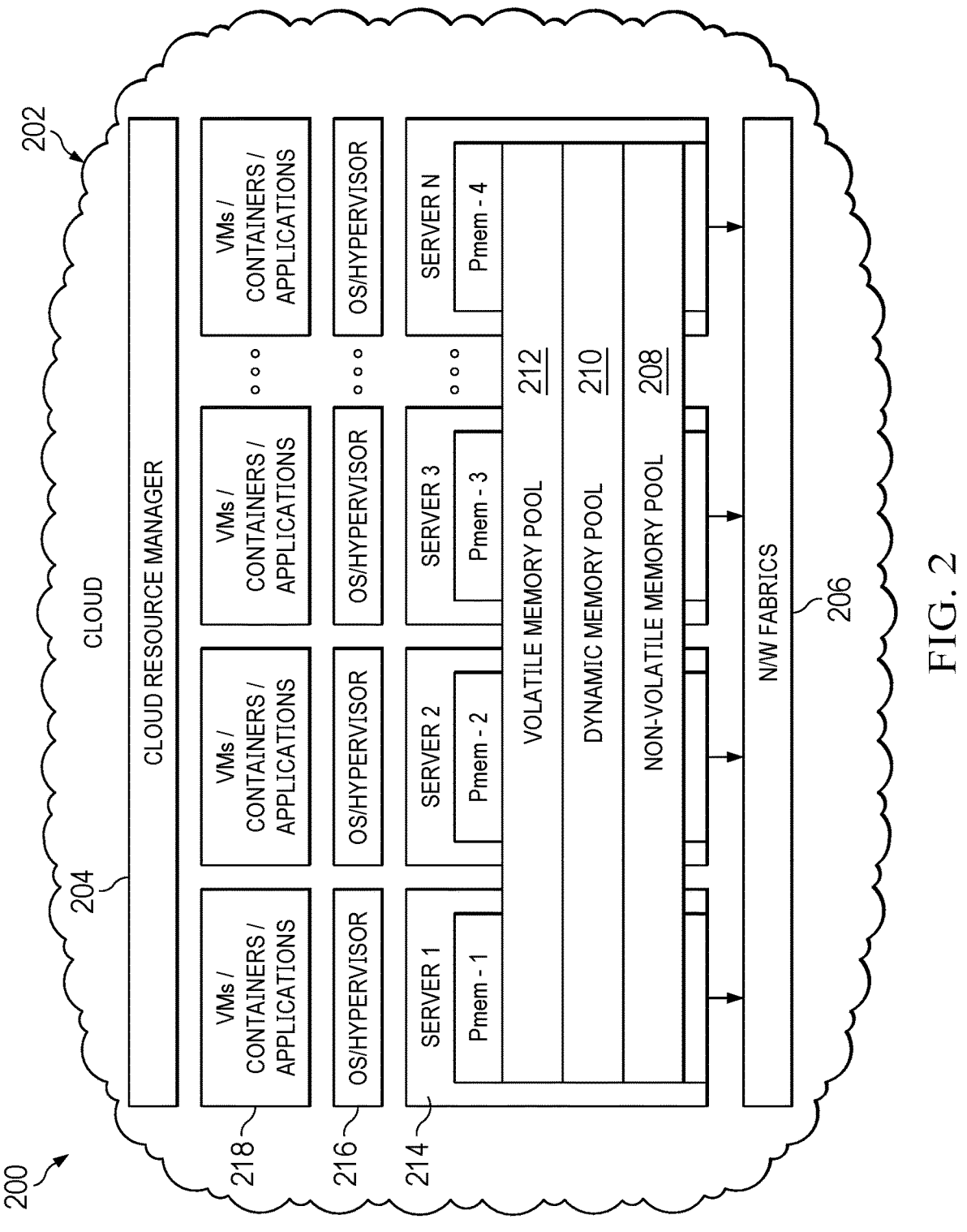
FIG. 2 is a diagram of an architecture for dynamically regulating memory pools for a cloud computing platform, in accordance with an example embodiment of the present disclosure.

FIG. 2 is a diagram of an architecture 200 for dynamically regulating memory pools for a cloud computing platform, in accordance with an example embodiment of the present disclosure. Architecture 200 includes cloud computing platform 202, cloud resource manager 204, network fabric 206, non-volatile memory pool 208, dynamic memory pool 210, volatile memory pool 212, servers 1-N 214, OS/hypervisors 216 and VMs/containers/applications 218.

Cloud computing platform 202 can be implemented in hardware or a suitable combination of hardware and software, and can include a plurality of distributed data processors such as servers 214 or other suitable systems or components. Cloud computing platform 202 can store one or more algorithms in non-transient data memory devices of the distributed data processors that cause each data processors to coordinate its function with the other data processors.

Cloud resource manager 204 can be implemented in hardware or a suitable combination of hardware and software, and can include one or more algorithms that cause cloud resource manager 204 to perform dynamic memory allocation, as discussed and described further herein. In one example embodiment, cloud resource manager 204 can coordinate the allocation of persistent memory in servers 214 into non-volatile memory pool 208, dynamic memory pool 210 and volatile memory pool 212, as discussed and described herein.

Network fabric 206 can be implemented in hardware or a suitable combination of hardware and software, and can include a plurality of data routing and transmission devices that are configured to support network communications between servers 214.

Non-volatile memory pool 208 can be implemented in hardware or a suitable combination of hardware and software, and can include a plurality of distributed persistent memory devices of servers 214 or other suitable systems or devices that are configured to contribute persistent memory to non-volatile memory pool 208. In one example embodiment, non-volatile memory pool 208 can be configured as discussed and described in greater detail herein, or in other suitable manners.

Dynamic memory pool 210 can be implemented in hardware or a suitable combination of hardware and software, and can include a plurality of distributed persistent memory devices of servers 214 or other suitable systems or devices that are configured to contribute persistent memory to dynamic memory pool 210. In one example embodiment, dynamic memory pool 210 can be configured as discussed and described in greater detail herein, or in other suitable manners.

Volatile memory pool 212 can be implemented in hardware or a suitable combination of hardware and software, and can include a plurality of distributed persistent memory devices of servers 214 or other suitable systems or devices that are configured to contribute persistent memory to volatile memory pool 212. In one example embodiment, volatile memory pool 212 can be configured as discussed and described in greater detail herein, or in other suitable manners.

Servers 214 can be implemented in hardware or a suitable combination of hardware and software, and can include non-transient data memory that stores one or more algorithms that can be loaded into data processing devices of servers 214. In one example embodiment, servers 214 can be configured as discussed and described in greater detail herein, or in other suitable manners.

OS/hypervisors 216 can be implemented in hardware or a suitable combination of hardware and software, and can include non-transient data memory that stores one or more algorithms that can be loaded into data processing devices of servers 214. In one example embodiment, OS/hypervisors 216 can be configured as discussed and described in greater detail herein, or in other suitable manners.

VMs/containers/applications 218 can be implemented in hardware or a suitable combination of hardware and software, and can include non-transient data memory that stores one or more algorithms that can be loaded into data processing devices of servers 214. In one example embodiment, VMs/containers/applications 218 can be configured as discussed and described in greater detail herein, or in other suitable manners.

FIG. 3 is a diagram of an algorithm 300 for dynamically regulating memory pools for a cloud computing platform, in accordance with an example embodiment of the present disclosure.

Algorithm 300 starts at 302, where the algorithm is initiated. In one example embodiment, algorithm 300 can be initiated when a new component is added to a cloud computing platform or in other suitable manners as discussed and disclosed in greater detail herein. The algorithm then proceeds to 304.

At 304, a user activates a control such as the F2 function to access BIOS settings, or BIOS settings can be accessed in other suitable manners. The algorithm then proceeds to 306.

At 306, a user selects a cloud optimized memory profile from one or more BIOS user interface controls. In one example embodiment, the BIOS user interface controls can be modified to provide additional user functionality as discussed or described in greater detail herein or in other suitable manners. The algorithm then proceeds to 308.

At 308, the BIOS configures memory application direct mode areas. In one example embodiment, the BIOS can configure the memory application direct mode areas as discussed or described in greater detail herein or in other suitable manners. The algorithm then proceeds to 310.

At 310, the BIOS saves the configuration changes and exits BIOS mode. In one example embodiment, the BIOS user interface can provide functionality as discussed or described in greater detail herein or in other suitable manners. The algorithm then proceeds to 312.

At 312, the processor boots to the OS stage. In one example embodiment, the boot process can be implemented as discussed or described in greater detail herein or in other suitable manners. The algorithm then proceeds to 314.

At 314, the OS fetches memory configuration details from BIOS. In one example embodiment, the OS can obtain memory configuration details from BIOS as discussed or described in greater detail herein or in other suitable manners. The algorithm then proceeds to 316.

At 316, the OS publishes Pmem metadata to CRM. In one example embodiment, the OS can publish Pmem metadata to CRM as discussed or described in greater detail herein or in other suitable manners. The algorithm then proceeds to 318 and 322.

At 318, the OS memory manager monitors memory requirements for time varying workloads. In one example embodiment, the OS memory manager can monitor memory requirements as discussed or described in greater detail herein or in other suitable manners. The algorithm then proceeds to 320.

At 320, the OS memory manager requests an allocation of memory from the CRM. In one example embodiment, the OS can interface with the CRM as discussed or described in greater detail herein or in other suitable manners. The algorithm then proceeds to 326.

At 322, the CRM gathers Pmem metadata. In one example embodiment, the CRM can gather Pmem metadata as discussed or described in greater detail herein or in other suitable manners. The algorithm then proceeds to 324.

At 324, the CRM creates volatile and non-volatile memory pools. In one example embodiment, the CRM can create volatile and non-volatile memory pools as discussed or described in greater detail herein or in other suitable manners. The algorithm then proceeds to 326.

At 326, the CRM receives a request for memory allocation from an OS memory manager. In one example embodiment, the CRM can receive a request for memory allocation from an OS memory manager as discussed or described in greater detail herein or in other suitable manners. The algorithm then proceeds to 328.

At 328, the CRM allocates memory and update memory allocation records. In one example embodiment, the CRM can allocate memory and update memory allocation records as discussed or described in greater detail herein or in other suitable manners.

In operation, algorithm 300 can be used to dynamically regulate memory pools for a cloud computing platform. Although algorithm 300 is shown as a flow chart, a person of skill in the art will recognize that it can also or alternatively be implemented as a state diagram, using object-oriented programming, as a ladder diagram, using other suitable programming paradigms or a suitable combination of programming paradigms.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more micro-computers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human program-mer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implement-ing an algorithm using a processor should require no expla-nation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algo-rithmic functions. Unless a specific algorithm is disclosed, then any suitable algorithm that would be known to one of skill in the art for performing the function using the asso-ciated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail mes-sage, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with program-ming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodi-ments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for managing non-transient memory in a cloud computing environment, comprising:
   a plurality of data processors configured to cooperatively provide a cloud computing environment;
   a persistent memory pool system configured to interact with each of the plurality of data processors to identify persistent non-transient data memory devices at each of the data processors and to define fixed address ranges for a volatile memory pool and a non-volatile memory pool and a remaining address range for a dynamic memory pool, and responsive to a utilization threshold being exceeded for the volatile memory pool or the non-volatile memory pool, to reallocate capacity from the dynamic memory pool to the volatile memory pool or the non-volatile memory pool; and
   a plurality of memory pools created by the persistent memory pool system, wherein each of the plurality of memory pools has a designated function and is asso-ciated with one or more of the persistent non-transient data memory devices.

2. The system of claim 1 wherein the plurality of memory pools comprises the volatile memory pool.

3. The system of claim 1 wherein the plurality of memory pools comprises the dynamic memory pool.

4. The system of claim 1 wherein the plurality of memory pools comprises the non-volatile memory pool.

5. The system of claim 1 wherein the plurality of memory pools comprises the volatile memory pool and the dynamic memory pool.

6. The system of claim 1 wherein the plurality of memory pools comprises the volatile memory pool, the dynamic memory pool and the non-volatile memory pool.

7. The system of claim 1 wherein each of the plurality of data processors can allocate a user-selected amount of memory to each memory pool.

8. The system of claim 1 wherein each of the plurality of data processors can allocate a predetermined memory profile to each memory pool.

9. The system of claim 1 wherein each of the plurality of data processors can dynamically allocate an amount of memory to each memory pool.

10. The system of claim 1 wherein the persistent memory pool system can allocate memory from one of the memory pools to a different data processor of the plurality of data processors.

11. A method for managing non-transient memory in a cloud computing environment, comprising:

interacting with each of a plurality of data processors using a persistent memory pool system;

identifying persistent non-transient data memory devices at each of the data processors using the persistent memory pool system;

creating a plurality of memory pools using the persistent memory pool system, wherein each of the plurality of memory pools has a designated function and is implemented using one or more of the persistent non-transient data memory devices; and defining fixed address ranges for a volatile memory pool and a non-volatile memory pool and a remaining address range for a dynamic memory pool, and responsive to a utilization threshold being exceeded for the volatile memory pool or the non-volatile memory pool, reallocating capacity from the dynamic memory pool to the volatile memory pool or the non-volatile memory pool.

12. The method of claim 11 wherein creating the plurality of memory pools using the persistent memory pool system comprises creating a volatile memory pool.

13. The method of claim 11 wherein creating a plurality of memory pools using the persistent memory pool system comprises creating a dynamic memory pool.

14. The method of claim 11 wherein creating a plurality of memory pools using the persistent memory pool system comprises creating a non-volatile memory pool.

15. The method of claim 11 wherein creating a plurality of memory pools using the persistent memory pool system comprises creating a volatile memory pool and a dynamic memory pool.

16. The method of claim 11 wherein creating a plurality of memory pools using the persistent memory pool system comprises creating a volatile memory pool, a dynamic memory pool and a non-volatile memory pool.

17. The method of claim 11 further comprising allocating a user-selected amount of memory to each memory pool from each of the plurality of data processors.

18. The method of claim 11 further comprising allocating a predetermined memory profile to each memory pool.

19. The method of claim 11 further comprising dynamically allocating an amount of memory to each memory pool.

20. The method of claim 11 further comprising allocating memory from one of the memory pools to a different data processor of the plurality of data processors.

* * * * *